(12) United States Patent
Hiroshima

(10) Patent No.: US 9,048,698 B2
(45) Date of Patent: Jun. 2, 2015

(54) HOIST

(75) Inventor: Tetsu Hiroshima, Nakakoma-gun (JP)

(73) Assignee: Kito Corporation, Yamanashi (JP)

( * ) Notice: Subject to any disclaimer, the term of this patent is extended or adjusted under 35 U.S.C. 154(b) by 49 days.

(21) Appl. No.: 13/884,600

(22) PCT Filed: Nov. 22, 2011

(86) PCT No.: PCT/JP2011/076924
§ 371 (c)(1),
(2), (4) Date: May 9, 2013

(87) PCT Pub. No.: WO2012/070579
PCT Pub. Date: May 31, 2012

(65) Prior Publication Data
US 2013/0221809 A1    Aug. 29, 2013

(30) Foreign Application Priority Data

Nov. 25, 2010 (JP) ................ 2010-262814

(51) Int. Cl.
*B66D 1/12* (2006.01)
*H02K 9/04* (2006.01)
*B66D 3/20* (2006.01)
*B66D 3/26* (2006.01)
*H02K 7/116* (2006.01)

(52) U.S. Cl.
CPC .. *H02K 9/04* (2013.01); *B66D 3/20* (2013.01); *B66D 3/26* (2013.01); *H02K 7/116* (2013.01)

(58) Field of Classification Search
USPC ......................... 254/362, 266, 342
See application file for complete search history.

(56) References Cited

U.S. PATENT DOCUMENTS

| 4,103,872 | A | * | 8/1978 | Hirasuka ...................... 254/356 |
| 4,636,962 | A | * | 1/1987 | Broyden et al. .............. 700/228 |
| 4,944,056 | A | * | 7/1990 | Schroeder et al. ............... 5/85.1 |
| 5,632,469 | A | * | 5/1997 | Heun et al. .................... 254/267 |

(Continued)

FOREIGN PATENT DOCUMENTS

| EP | 2 128 075 A1 | 12/2009 |
| GB | 2 022 049 A  | 12/1979 |

(Continued)

OTHER PUBLICATIONS

Extended European Search Report for EP Application No. 11 84 3761 dated Apr. 24, 2014, 8pp.

(Continued)

*Primary Examiner* — Emmanuel M Marcelo
(74) *Attorney, Agent, or Firm* — Christie, Parker & Hale, LLP

(57) ABSTRACT

A hoist with a regenerative resistor contains the following in a casing: a load-raising/lowering motor driven by an inverter control device and provided with a forced-cooling means; and a mechanism part containing a reduction mechanism part and a load sheave that uses power from the reduction mechanism part to take up and let out a chain. The load-raising/lowering motor, mechanism part, inverter control device, and regenerative resistor are distributed inside the casing to achieve a balance of weight about the center of gravity of the load applied when raising or lowering. Also, the inverter control device and the regenerative resistor are affixed to the casing, in close contact therewith, in parts of the casing separated from each other with the mechanism part therebetween.

9 Claims, 7 Drawing Sheets

(56) References Cited

U.S. PATENT DOCUMENTS

| | | | |
|---|---|---|---|
| 6,966,545 B2 | 11/2005 | Eising et al. | |
| 7,226,041 B2* | 6/2007 | Ledford | 254/342 |
| 2004/0055185 A1* | 3/2004 | Onsager et al. | 37/307 |
| 2006/0169961 A1* | 8/2006 | Ledford | 254/342 |
| 2010/0127818 A1 | 5/2010 | Ishikawa et al. | |
| 2011/0303886 A1* | 12/2011 | Cryer et al. | 254/340 |

FOREIGN PATENT DOCUMENTS

| | | |
|---|---|---|
| JP | 4-125289 A | 4/1992 |
| JP | 7-53186 | 2/1995 |
| JP | 09-202592 | 8/1997 |
| JP | 11-341743 A | 12/1999 |
| JP | 2005-280975 A | 10/2005 |
| WO | WO 2008/114608 A1 | 9/2008 |

OTHER PUBLICATIONS

International Search report issued in International Application No. PCT/JP2011/076924, mailed Jan. 24, 2012, 2pp.

* cited by examiner

HOIST

CROSS-REFERENCE TO RELATED APPLICATION

This application is a National Phase Patent Application and claims the priority of International Application No. PCT/JP2011/076924 filed on Nov. 22, 2011, which claims priority to and benefit of Japanese Patent Application No. 2010-262814 filed on Nov. 25, 2010, the entire disclosures of which are incorporated herein by reference.

FIELD OF THE INVENTION

The present invention relates to a hoist, such as an electric chain hoist and an electric hoist, in which an electric motor is driven by an incorporated inverter controller in order to lift and lower a load. In particular, the present invention relates to a hoist for which an arrangement and a configuration of a heat source such as an inverter controller, a motor, a regenerative resistor and the like are taken into account, and a forced cooling means is used to provide a heat dissipation effect.

BACKGROUND ART

A hoist, such as an electric chain hoist and an electric hoist, includes an electric motor driven by an inverter controller as a motor for lifting and lowering a load. In such a hoist, the inverter controller and other various heat sources (a motor, a regenerative resistor and the like) are accommodated in a casing, and heat generated during an operation has been problematic. For example, heat generated by the inverter controller increases, particularly at the time of a high-load operation. The heat affects a constituent element such as a power transistor of the inverter controller or the like, possibly hindering a normal operation.

The applicant of the present application has proposed a hoist that can efficiently dissipate heat as described above (see JP-A-2008-230751).

The hoist described in JP-A-2008-230751 includes a motor for lifting and lowering a load, a reduction gear mechanism, and a regenerative braking resistance unit, in which the motor is driven by an inverter controller incorporated in a main body of the hoist, and the regenerative braking resistance unit provides a braking effect by supplying a current generated by the motor at the time of lowering a suspended load to the regenerative braking resistance unit. The inverter controller of the hoist is closely attached to a casing of the reduction gear mechanism with surface contact, so that heat generated by the inverter controller is released to the casing of the reduction gear mechanism.

SUMMARY OF THE INVENTION

Problem to be Solved by the Invention

In fact, according to the above-described hoist, with a simple configuration, heat generated by the inverter controller incorporated therein or by the regenerative braking resistance unit can be efficiently released to the atmosphere, which allows for more frequent operations.

However, the above hoist still has the following problems: since (1) the regenerative resistance unit and the inverter controller that generate intense heat are situated close to each other, and (2) the regenerative resistance unit is attached to an outer surface of the casing that accommodates the inverter controller in an aim to provide a natural cooling effect with air through exposure to the air, it is necessary to reconsider an arrangement and a configuration of the heat generating source such as the inverter controller, the motor, the regenerative resistance unit and the like, in order to improve a heat dissipating capacity.

Accordingly, an object of the present invention is to provide a hoist that provides an increased effect of heat dissipation and allows for a compact mechanism, by improving with regard to the above-described respects (1) and (2), in order to improve a heat dissipating capacity.

Means for Solving the Problem

In order to solve the above-described problem, according to an embodiment of the invention, a hoist comprises a motor for lifting and lowering a load, the motor being driven by an inverter controller and including a forced cooling unit, a mechanism unit including a reduction gear mechanism and a load sheave for winching up and down a chain with power from the reduction gear mechanism, a casing for accommodating the motor and the mechanism unit, and a regenerative resistance unit to which regenerative electric power generated in the motor is supplied, wherein the motor, the mechanism unit, the inverter controller and the regenerative resistance unit are arranged in the casing in a distributed manner so that weights thereof balance out one another in relation to a center of loading that acts on the hoist at the time of winching up and down.

With such a configuration, the motor for lifting and lowering a load, the mechanism unit, the inverter controller and the regenerative resistance unit are arranged in the casing by taking into account a weight distribution. Accordingly, usability of the hoist is improved. In addition, it is advantageous with respect to heat dissipation, since the heat generating elements such as the motor, the inverter controller, and the regenerative resistance unit are arranged in a distributed manner.

According to an embodiment of the invention, the inverter controller and the regenerative resistance unit are arranged so as to be separated from each other with the mechanism unit interposed therebetween, and are closely fixed to the casing.

Since the inverter controller and the regenerative resistance unit are fixed to the casing at positions separate from each other with the mechanism unit interposed therebetween, either the inverter controller or the regenerative resistance unit is not substantially influenced by heat generated by the other.

According to an embodiment of the invention, the motor for lifting and lowering a load, the inverter controller and the regenerative resistance unit are arranged in relation to one another, based on a distance from the center of the load to a center of the motor in a longitudinal direction, on a distance from the center of the load to the inverter controller, on a distance from the center of the load to the regenerative resistance unit, on a distance from the center of the load to a central axis of the motor, on a distance from the central axis of the motor to a center of the inverter controller, and on a distance from the central axis of the motor to a center of the regenerative resistance unit.

With such an arrangement, the motor, the inverter controller and the regenerative resistance unit, which are the main constituent elements of the hoist serving as heat sources and heavy objects, are arranged in relation to one another so as to balance their weights out.

According to an embodiment of the invention, the inverter controller is closely fixed to a part of the casing which partially surrounds the reduction gear mechanism filled with gear oil.

With such a configuration, heat generated by the inverter controller can be effectively released to the casing.

According to an embodiment of the invention, the regenerative resistance unit is closely fixed to a part of the casing close to the motor, and a forced cooling unit of the motor is adapted to provide a forced cooling effect for the regenerative resistance unit.

With such a configuration, the regenerative resistance unit can be forcibly cooled by the forced cooling unit of the motor for lifting and lowering a load.

According to an embodiment of the invention, a forced cooling unit is provided at an end of a motor shaft of the motor close to the inverter controller, the forced cooling unit being adapted to provide a forced cooling effect for the inverter controller.

With such a configuration, since heat generated by the inverter controller is forcibly dissipated, a heat dissipating effect can be improved.

According to the present invention, by taking into account the arrangement and the configuration of the heat sources, the heat dissipating effect can be improved. Since the heat dissipating effect can be efficiently provided for the regenerative resistance unit as well as for the inverter controller, it is possible to operate the hoist more frequently.

In addition to the arrangement and the configuration of the heat sources, the weight balance of the heat sources is taken into account. As a result, usability of the hoist can be improved, and a total size of the hoist can be decreased.

EMBODIMENT FOR CARRYING OUT THE INVENTION

[First Embodiment]

Figure 1:
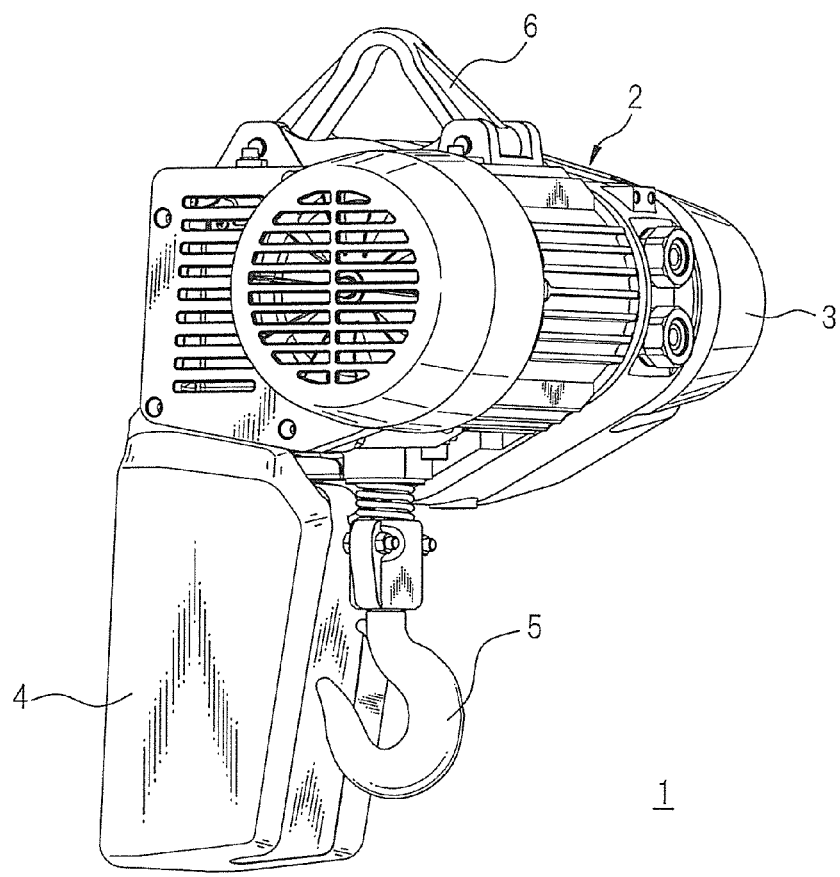
FIG. 1 is a perspective view illustrating a hoist according to a first embodiment of the present invention.
Figure 2:
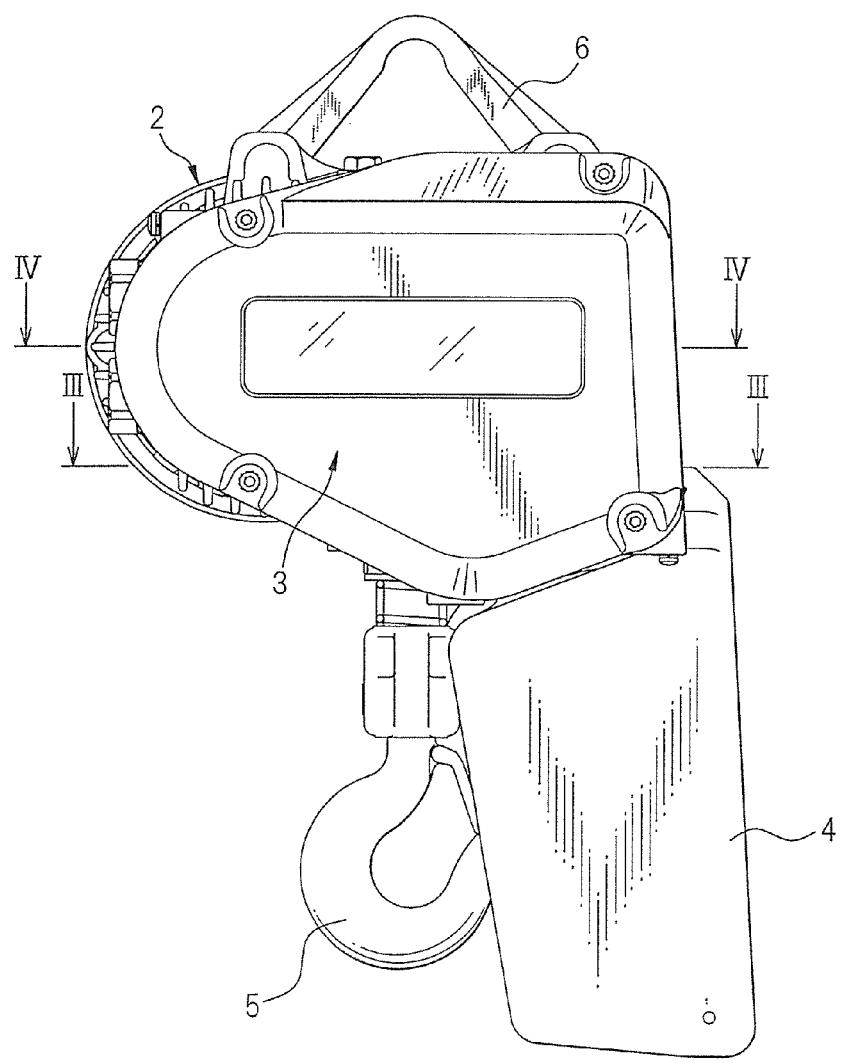
FIG. 2 is a side view illustrating the hoist in FIG. 1.

FIGS. 1 and 2 illustrate a hoist 1 according to a first embodiment of the present invention.

The hoist 1 is an inverter-driven electric chain hoist including a motor for lifting and lowering a load, the motor being driven by an inverter controller, a mechanism unit which includes a reduction gear mechanism and a load sheave for winching up and down a chain with power transmitted from the reduction gear mechanism, and a casing 2 for accommodating the motor and the mechanism unit as described below. The casing 2 is provided with an electrical component accommodating unit 3 adjacent thereto, and the electrical component accommodating unit 3 accommodates electrical components of the inverter controller, a control circuit or the like. In addition, a chain bucket 4 for accommodating a chain is integrally attached to the casing 2. The chain bucket 4 carries a hook unit 5 on a side thereof, and the hook unit 5 is adapted to winch up and down a load by the chain (not shown). A hanged arm 6 for hanging the hoist 1 from a beam of a building or the like (not shown) is attached to the top of the casing 2.

Figure 3:
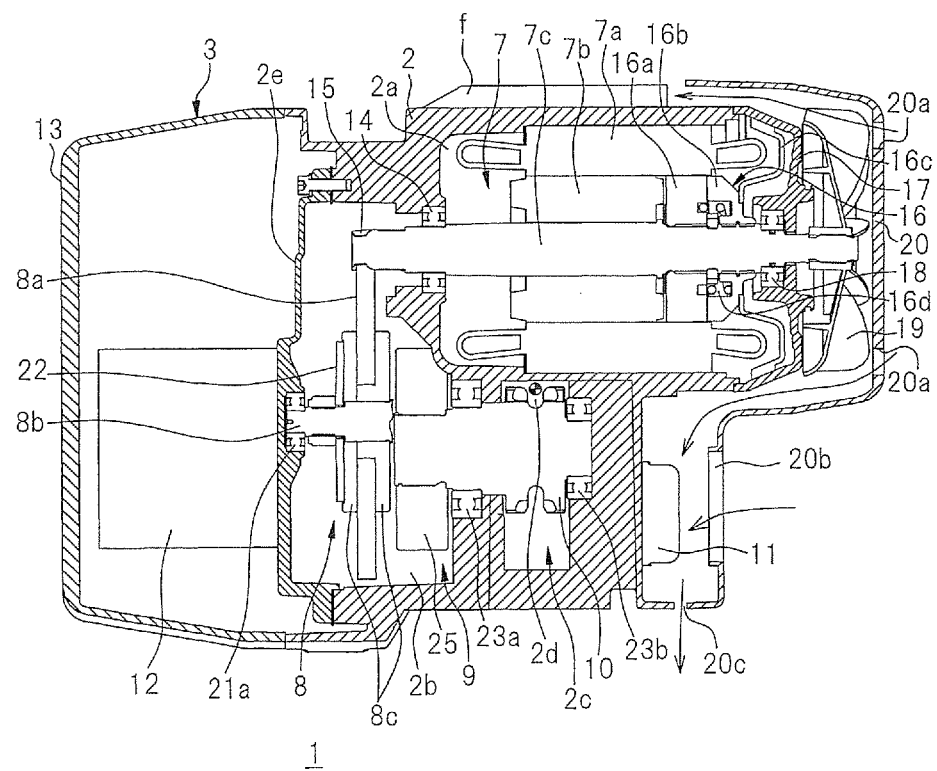
FIG. 3 is a longitudinal section view illustrating the hoist in FIG. 2, taken along line
Figure 4:
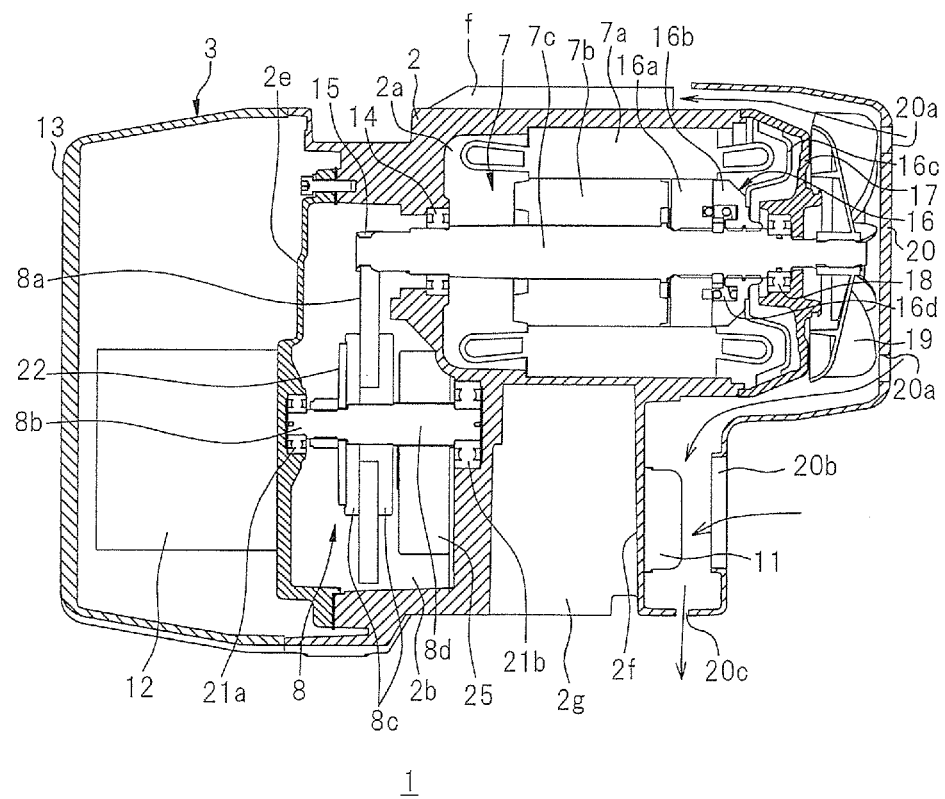
FIG. 4 is a longitudinal section view illustrating the hoist in FIG. 2, taken along line IV-IV.

Referring to FIGS. 3 and 4, which are sectional views illustrating the above-described hoist 1, the hoist 1 will be described in more detail.

The hoist 1 includes the motor 7 for lifting and lowering a load which is driven by the inverter controller, the reduction gear mechanism 8 which constitutes the mechanism unit 9, a load sheave 10 for winching up and down the chain with power transmitted from the reduction gear mechanism 8, and a regenerative resistance unit 11 for converting regenerative power which is generated from the motor 7 when the load is winched down, into heat energy in order to dissipate it, each of those are arranged according to a positional relationship with one another within the casing 2 as described below. The hoist 1 also includes the inverter controller 12 incorporated into the electrical component accommodating unit 3 which is provided adjacent to the reduction gear mechanism 8 in the casing 2, and a power source noise filter, which is not illustrated, accommodated therein. The inverter controller 12 is a unit including a direct current power source circuit, an inverter circuit, a control circuit and the like. An alternating current power source and a pendant switch (command button) is connected to the inverter controller 12, and based on a command to the pendant switch, the motor for lifting and lowering is controlled. The inverter controller 12 and the power source noise filter are enclosed in the casing 2 by a lid-like controller cover 13.

The inside of the casing 2 is substantially partitioned into a motor chamber 2a, a mechanism chamber 2b, and a chain drawing section 2c, in order to place the motor 7 for lifting and lowering a load and the reduction gear mechanism unit 8 in position, respectively. The chain drawing section 2c is provided with an opening 2d for drawing a chain.

The motor 7 includes, in the motor chamber 2a, a cylindrical stator 7a around which a stator coil is wound, and a rotor 7b inserted to a central bore of the stator 7a. The rotor 7b includes a motor shaft 7c integrally fixed and extending in a longitudinal axial direction.

As illustrated in FIGS. 3 and 4, the motor shaft 7c is rotatably supported by a bearing 14 on a partitioning wall that partitions a left side part of the casing 2 into the motor chamber 2a and the mechanism chamber 2b. A pinion gear 15 for transmitting power to the reduction gear mechanism 8, which will be described below, is attached to the left end of the motor shaft 7c.

A pull-rotor type of brake 16 is fitted to a right side part of the motor shaft 7c. The right side part of the rotor shaft 7c is attached to an end cover 17 by insertion via a bearing 10. A fan 19 as a forced cooling means is attached to the right end of the rotor shaft 7c.

The brake 16 includes a pull rotor 16a of a magnetic material provided on the motor shaft 7c by spline engagement, a movable core 16b of a magnetic material arranged adjacent to the pull rotor 16a, and a brake drum 16c fixed to the movable core 16b. The movable core 16b is provided on the motor shaft 7c by spline engagement such that the movable core 16b cannot rotate relative to the motor shaft 7c, but can move relative to the motor shaft 7c in a longitudinal axial direction over a predetermined range. Between the movable core 16b and the pull rotor 16a, there is a coil spring 16d that always urges the movable core 16b so that the brake drum 16c is pressed against an inner circumferential surface of the end cover 17 via the movable core 16b.

The fan 19 is provided with a fan cover 20 on a surface protruding from the motor chamber 2a of the casing 2. The fan cover 20 is configured to cover not only the fan 19, but also a surface of the regenerative resistance unit 11, which will be described below. The fan cover 20 is provided with a ventilation hole 20a at a position corresponding to the fan 19, with an opening 20b at a position corresponding to the regenerative resistance unit 11, and with an exhaust hole 20c.

The regenerative resistance unit 11 is attached to a plate-shaped regenerative resistance unit attachment part 2f of the casing 2 on the side of the motor 7. The regenerative resistance unit attachment part 2f protrudes in a direction perpendicular to the motor shaft 7c. The regenerative resistance unit attachment part 2f is provided with a rib 2g on the opposite side surface of the side where the regenerative resistance unit 11 is attached, and the rib 2g extends from the side surface toward the mechanism chamber 2b. Heat generated by the regenerative resistance unit 11 is conducted to the plate-shaped rib 2g as well as the plate-shaped regenerative resistance unit attachment part 2f, so that it is forcibly cooled by the fan 19 and naturally cooled by the rib 2g. Although not illustrated, the two ribs 2g are provided so as to be arranged at upper and lower positions, respectively.

A ventilation hole may also be provided in the regenerative resistance unit attachment part 2f or the like, so as to forcibly cool the rib 2g with the fan 19.

Next, the reduction gear mechanism 8 of the mechanism unit 9 arranged in the mechanism chamber 2b will be described.

The reduction gear mechanism 8 includes a first reduction gear 8a that meshes with the pinion gear 15 at the left end of the motor shaft 7c. The first reduction gear 8a is attached to a gear shaft 8b supported on an inner wall of the casing of the mechanism chamber 2b by bearings 21a and 21b, via a friction clutch 8c adapted to produce pressing force by a spring member 22 (for example, disc spring). The reduction gear mechanism 8 includes a second reduction gear 8d provided on the gear shaft 8b. The second reduction gear 8d has a smaller number of teeth than that of teeth of the first reduction gear 8a. The inverter controller 12 is attached to a casing cover 2e that partitions the mechanism chamber 2b and the electronic component accommodating section 3.

The mechanism chamber 2b is filled with well known gear oil.

The mechanism unit 9 includes the load sheave 10 and a load gear 25. The load sheave 10 are rotatably supported on the chain drawing section 2c and on a partitioning wall that partitions the mechanism chamber 2b, by bearings 23a and 23b from the interior of the mechanism chamber 2b to the chain drawing section 2c. The load gear 25 is attached to an end of the load sheave 10 in the mechanism chamber 2b, and meshes with the second reduction gear 8d of the reduction gear mechanism 8.

The motor 7, the mechanism unit 9, the inverter controller 12 and the regenerative resistance unit 11 of the above-described hoist 1 are arranged in the casing 2 in relation to one another as described below.

Figure 5A:
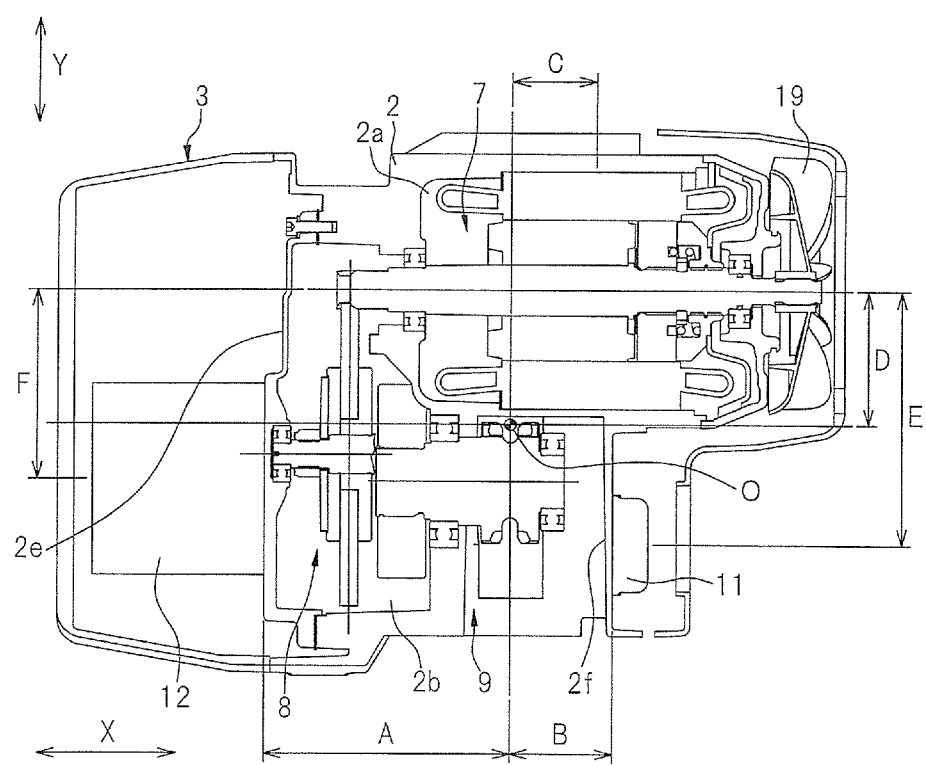
FIG. 5a is a section view illustrating an arrangement of constituent elements in relation to a center of a load of the hoist according to the present invention.
Figure 5B:
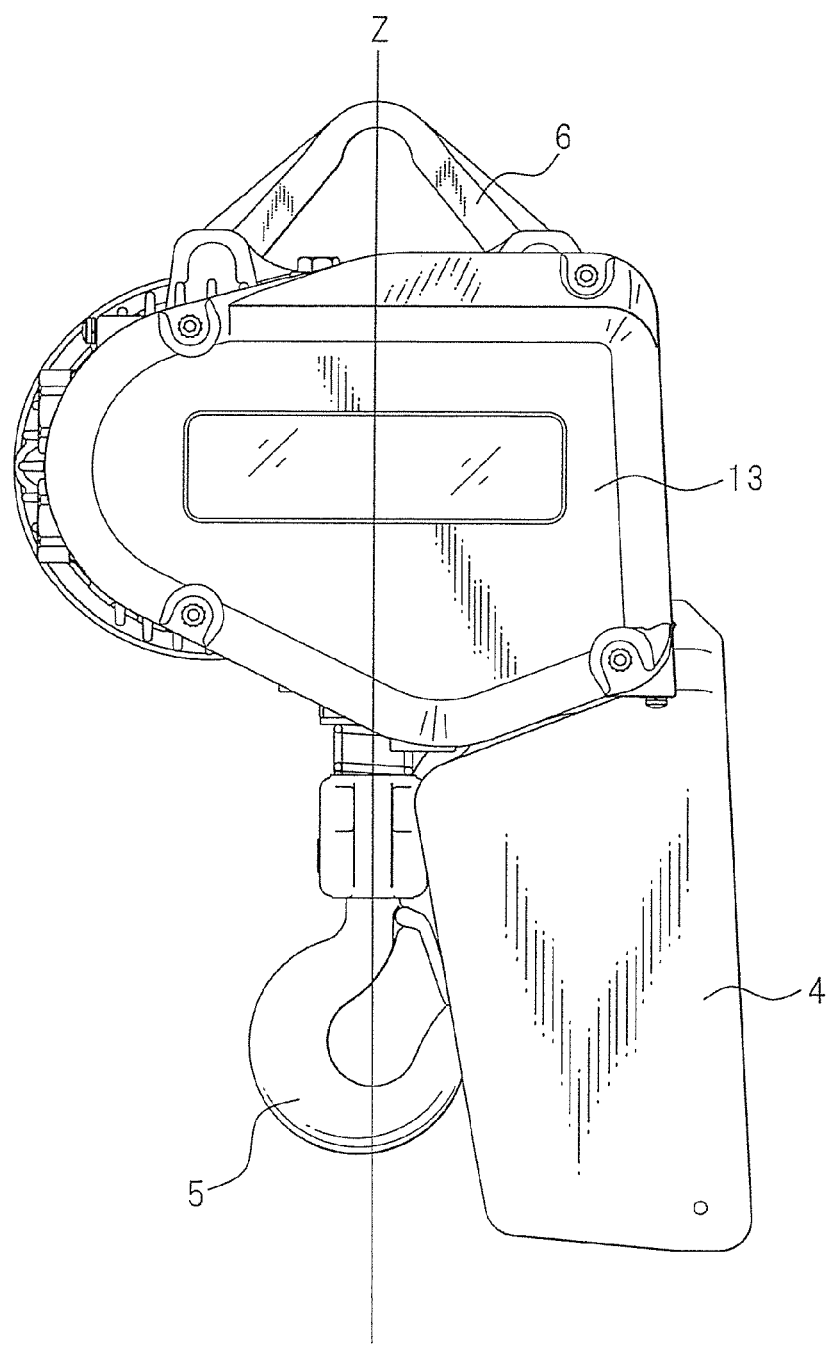
FIG. 5b is a side view illustrating a positional relationship of the hoist relative to an axis extending through the center of the load of the hoist according to the present invention.

For the purpose of explanation of the arrangement, a load center O which is a center of loading during an operation for lifting and lowering a load is first determined in the casing 2 (see FIG. 5). As illustrated in FIG. 5b, a vertical loading axis Z passing through the load center O is set so as to extend through the casing 2, the center of the hook unit 5 for lifting and lowering a load, and the center of the hanged arm 6 at the top of the casing 2.

In relation to the load center O, the following relationship is satisfied:

$A > B \geq C$, $E > D$, and $F > D$, where

A is a distance in a longitudinal direction (a distance in a direction X perpendicular to the vertical loading axis Z) from the load center O to a bottom surface of the inverter controller 12 (an end surface of the casing of the inverter controller 12 in close contact with an outer side surface of the casing cover 2e of the casing 2 that accommodates the reduction gear mechanism 8);

B is a distance in the longitudinal direction (a distance in the direction X perpendicular to the vertical loading axis Z) from the load center O to a bottom surface of the regenerative resistance unit 11 (an end surface of the regenerative resistance unit 11 in close contact with the casing 2);

C is a distance in the longitudinal direction (a distance in the direction X perpendicular to the vertical loading axis Z) from the load center O to the center of the motor 7 in the longitudinal direction;

D is a distance in a horizontal direction (a distance in a direction Y perpendicular to the vertical loading axis Z) from the load center O to the central axis of the motor 7;

E is a distance in the horizontal direction (a distance in the direction Y perpendicular to the vertical loading axis Z) from the central axis of the motor 7 to the center of the regenerative resistance unit 11 (the central axis of the regenerative resistance unit 11 in a direction parallel to the central axis of the motor 7); and F is a distance in the horizontal direction (a distance in the direction Y perpendicular to the vertical loading axis Z) from the central axis of the motor 7 to the center of the inverter controller 12 (the central axis of the inverter controller 12 in a direction parallel to the central axis of the motor 7).

In other words, according to the above arrangement, the motor 7, the reduction gear mechanism 8 and the load sheave 10 have the central axes for transmitting power and the central axes are situated in the casing 2 so as to be distant from one another in the direction Y and parallel to the direction X, respectively, so that power is transmitted from the motor 7 to the load sheave 10.

The inverter controller 12 and the regenerative resistance unit 11 are closely fixed to the casing 2 with the mechanism unit 9 interposed therebetween, and on the outer side in the direction X perpendicular to the vertical loading axis Z of the casing 2 which accommodates the mechanism unit 9 such as the reduction gear mechanism 8.

The inverter controller 12 has a configuration in which a control circuit board on which a power transistor, a heat sink and other various electronic parts are mounted, and other electric components are installed in a casing. Accordingly, the inverter controller 12 has a weight corresponding to these components, including the casing.

On the other hand, the regenerative resistance unit 11 has a configuration in which a circuit formed from a plurality of resistance elements is mounted. Although not illustrated, the regenerative resistance unit 11 is electrically connected to the inverter controller 12. When the motor 7 is in operation to lower a load, the motor 7 performs a regenerative operation by a weight of the load. In this process, electric power regenerated in the motor 7 is transmitted to the regenerative resistance unit 11 through the inverter controller 12, and as a result, the electric power can be transformed into heat energy to be dissipated.

The hoist 1 according to the first embodiment is configured as described above. In the following, an operation and effect of the hoist 1 will be described.

In order to lift a load, an operator operates a command button to supply electric power from the inverter controller 12 to the motor 7, so that the stator coil of the stator 7a is electrically powered to generate a rotational magnetic field. The pull rotor 16a of the brake 16 is then magnetized by a part of the magnetic field, and the movable core 16b is pulled toward the side where the pull rotor 16a is situated, against urging force of the coil spring 16d. As a result, the brake is released as the brake drum 16c fixed to the movable core 16b is separated from the inner circumferential surface of the end cover 17. The rotor 7b of the motor 7 is rotated, and the rotational movement is transmitted from the pinion gear 15 at the left end of the motor shaft 7c to the load sheave 10 via the first reduction gear 8a and the second reduction gear 8d of the reduction gear mechanism 8 and the load gear 25. Therefore, the load hanged by the hook unit 5 is winched up. Similarly, upon an operation of the command button, the load can be winched down.

In the process of winching down, the motor 7 performs a regenerative operation. In order to prevent an excessive voltage due to the regenerated electric power from being applied to the inverter controller 12, the regenerated electric power is supplied to the regenerative resistance unit 11 and transformed into heat energy, so that the regenerated electric power can be dissipated.

When the chain is drawn out from the chain bucket 4 to lower the hook unit 5 to a position of a load, a weight of the chain bucket 4 is decreased as a result of the chain being drawn out. The hoist 1 is set so that the load center O along the vertical loading axis Z for lifting and lowering a load extends through the center of the hook unit 5 and the center of the hanged arm 6 at the top of the casing 2. The mechanism unit 9 is arranged in relation to the motor 7 that is a heavy object, such that the vertical loading axis Z extending through the load center O is situated therebetween. Further, the inverter controller 12 and the regenerative resistance unit 11 that are electrical components are arranged so as to face each other and so as to be distant from each other in the direction X or the direction Y perpendicular to the vertical loading axis Z in order to balance their weights. Accordingly, an operation for lifting the load can be performed, while the weight balance is maintained. As a result, usability can be greatly improved.

Therefore, a special member such as a counterweight for balancing weights of the conventional is no longer required in the casing or the like, or the number of special members can be remarkably reduced.

Further, ranging from the motor 7 to the reduction gear mechanism 8 of the mechanism unit 9 and the load sheave 10, they are not linearly arranged, but arranged in the casing 2 such that the central axes of the motor 7, the reduction gear mechanism 8 and the load sheave 10 are shifted from one another in the direction Y perpendicular to the vertical loading axis Z and arranged parallel to the direction X. Accordingly, the overall size of the casing 2, in particular, its size in the direction X, can be decreased, which allows the casing 2 to be compact.

In response to a working operation command for lifting a load, electric power is supplied from the inverter controller 12 to the motor 7. When the motor 7 is driven, the pull rotor 16a of the brake 16 is magnetized by a rotational magnetic field of the stator 7a to attract the movable core 16b to the side of the pull rotor 16a against urging force by the coil spring 16d. As a result, the brake is released, as the brake drum 16c fixed to the movable core 16b is detached from the inner circumfer-ential surface of the end cover 17. The rotor 7b is rotated, and the fan 19 provided at the right end of the rotor 7b is rotated, so that air flow is provided to the motor 7 and the regenerative resistance unit 11 through the ventilation hole 20a of the fan cover 20. The air passes through a fin f outside the casing 2 that accommodates the motor 7 to forcibly cool the motor 7, while cooling the regenerative resistance unit 11. Air from the atmosphere also flows to the regenerative resistance unit 11 through the opening 20b, and flows out through the exhaust hole 20c. Air from the atmosphere also flows in and out through the opening 20b, even when the motor is deactivated, promoting natural cooling of the regenerative resistance unit 11.

When the rotor 7b is rotated on a working operation command for lifting a load, rotational force is transmitted to the second reduction gear 8d through the pinion gear 15 at the left end of the motor shaft 7c, the first reduction gear 8a and the gear shaft 8b of the reduction gear mechanism 8. The rotational force is further transmitted from the second reduction gear 8d to the load gear 25 of the load sheave 10. As such, the rotational force becomes rotational power that has been decelerated according to a predetermined deceleration rate, and is transmitted to the load sheave 10.

During such a working operation, the power transistors of the inverter controller 12 generate heat, and therefore the temperature of the casing of the inverter controller 12 is increased.

However, an end surface of the casing that accommodates the inverter controller 12 is in close contact with the outer side surface of the casing 2 that accommodates the reduction gear mechanism 8, and further, the mechanism chamber 2b that accommodates the reduction gear mechanism 8 is filled with well known gear oil. Therefore, the above-mentioned heat can be effectively dissipated, so that it is possible to prevent heat from remaining in the casing that accommodates the inverter controller 12, and to prevent the temperature of the casing from being abnormally increased.

When a load hanged by the hook unit 5 is lowered, the motor 7 is driven so as to draw out the chain from the chain bucket 4 to winch down the hook unit 5. In response to an operation of the command button, electric power is supplied from the inverter controller 12 to the motor 7 to activate the brake 16. The movable core 16b is then pulled to the side of the pull rotor 16a against urging force by the coil spring 16d. The brake drum 16c fixed to the movable core 16b is detached from the inner circumferential surface of the end cover 17 to release the brake. The rotor 7b of the motor 7 is then rotated, and the rotational movement is transmitted from the pinion gear 15 at the left end of the motor shaft 7c to the load sheave 10 through the first reduction gear 8a and the second reduction gear 8d of the reduction gear mechanism 8, and the load gear 25. In this way, the load hanged by the hook unit 5 can be lowered.

In the process of winching down, the motor 7 performs a regenerative operation due to a weight of the load. The regenerated electric power is supplied to the regenerative resistance unit 11 and transformed into heat energy, so that the regenerated electric power can be dissipated.

Accordingly, although the temperature of the regenerative resistance unit 11 is increased, the regenerative resistance unit 11 can be forcibly cooled by air flowing to the regenerative resistance unit 11 through the ventilation hole 20a of the fan cover 20, as the fan 19 provided at the right end of the rotor 7b of the motor 7 is rotated.

As described above, in the hoist 1 according to the present embodiment, when a series of operations for winching up and down are performed, the motor 7 for lifting and lowering a load, the inverter controller 12, and the regenerative resistance unit 11 that generate heat are forcibly cooled by the fan 19 at the right end side of the rotor 7b. As for the inverter controller 12, an end surface of the casing that accommodates the inverter controller 12 is in close contact with the outer side surface of the casing 2 that accommodates the reduction gear mechanism 8, and further, the mechanism chamber 2b that accommodates the reduction gear mechanism 8 is filled with gear oil. Therefore, the heat can be effectively dissipated.

Moreover, the inverter controller 12 and the regenerative resistance unit 11 are provided at both sides of the casing 2 that accommodate the motor 7 and the mechanism unit 9 such as the reduction gear mechanism 8 in the direction X perpendicular to the vertical loading axis Z, and are closely fixed to the casing 2 with the mechanism unit 9 interposed therebetween. Therefore, the inverter controller 12 and the regenerative resistance unit 11 provide a heat dissipation effect without influence of heat from each other.

As a result, the hoist 1 of the present embodiment can be operated at higher frequencies, and has greater practical use.

[Second Embodiment]

Figure 6:
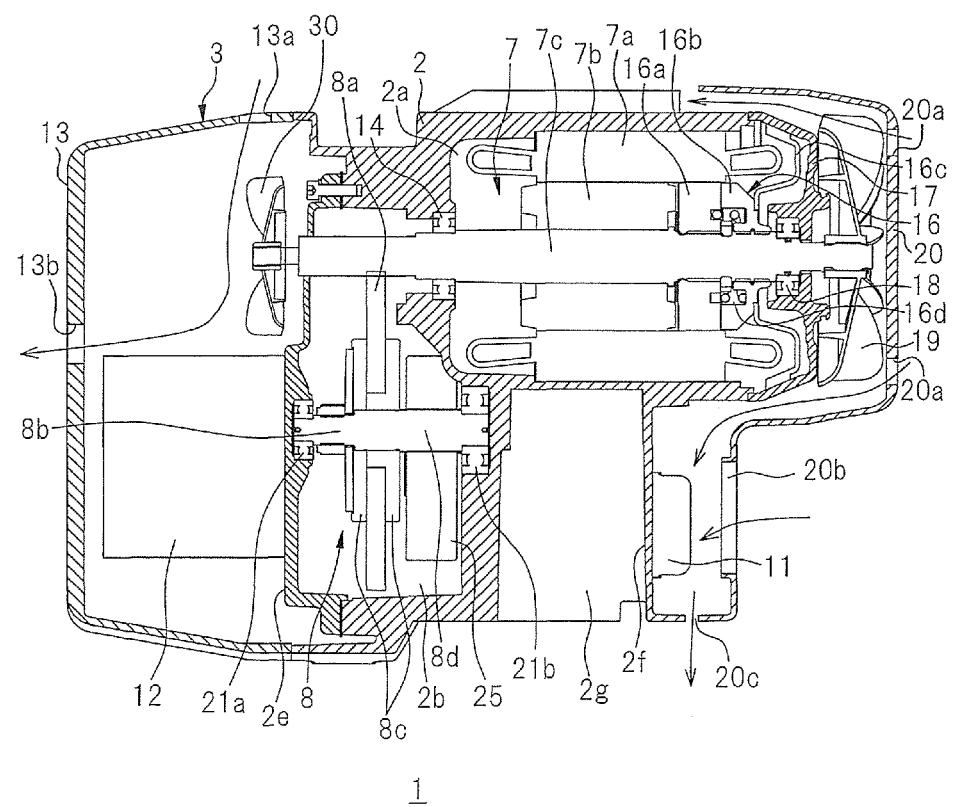
FIG. 6 is a longitudinal section view illustrating a hoist according to a second embodiment of the present invention.

A hoist according to the present invention can also be embodied by a hoist 1 illustrated in FIG. 6.

This hoist 1 has the same basic configuration as the hoist 1 according to the first embodiment with regard to the arrangement of the motor 7, the reduction gear mechanism 8 and the load sheave 10 in the casing 2 and the arrangement of the inverter controller 12 and the regenerative resistance unit 11. Thus, a description of these arrangements will be omitted.

As illustrated in FIG. 6, in the hoist 1 according to the second embodiment, a fan 30 is provided at an end of the motor shaft 7c of the motor 7 close to the inverter controller 12, in order to directly cool the inverter controller 12 with air.

In this case, the motor shaft 7c of the motor 7 protrudes from the casing cover 2e partitioning the mechanism chamber 2b that accommodates the reduction gear mechanism 8 and extends in the electrical component accommodating unit 3.

The controller cover 13 of the electrical component accommodating unit 3 is provided with a ventilation hole 13a at a position close to the fan 30. In addition, the controller cover 13 is provided with a ventilation hole 13b in a surface of the controller cover 13 facing the casing cover 2e.

Although not illustrated, the controller cover 13 may also be preferably provided with a guide member at a position close to the fan 30 in the interior thereof, such that air is efficiently delivered from the ventilation hole 13a to the inverter controller 12.

The hoist according to the present invention has been described above with reference to the exemplary embodiments. According to the hoist in which the arrangements of the heavy constituent elements ate taken into consideration, a conventional special balance weight is no longer required. Since the inverter controller and the regenerative resistance unit are arranged so as to be separated from each other with the mechanism unit interposed therebetween, the problem resulting from heat generation can also be overcome.

Further, since the hoist includes means for forcibly cooling the regenerative resistance unit and the inverter controller with air, a more efficient heat dissipation effect can be achieved. As a result, the hoist can endure a higher frequent and higher load operation, and has greater applicability.

The arrangements of the elements according to the embodiments are merely shown by way of example. Thus, the arrangements can be determined otherwise as necessary, depending on the weights of the respective constituent elements.

Although the embodiment in which the fan is provided as forcible cooling means for the inverter controller has been described, the forced cooling means is not limited to the fan, but may have another configuration.

LIST OF REFERENTIAL NUMERALS

1 Hoist
2 Casing
2a Motor chamber
2b Mechanism chamber
2c Chain drawing section
2d Chain drawing opening
2e Casing cover
2f Regenerative resistance unit attachment part
2g Rib
3 Electrical component accommodating unit
4 Chain bucket
5 Hook unit
6 Hanged arm
7 Motor for lifting and lowering a load
7a Stator
7b Rotor
7c Motor shaft
8 Reduction gear mechanism
8a First reduction gear
8b Gear shaft
8c Friction clutch
8d Second reduction gear
9 Mechanism unit
10 Load sheave
11 Regenerative resistance unit
12 Inverter controller
13 Controller cover
13a Ventilation hole
13b Ventilation hole
14 Bearing
15 Pinion gear
16 Brake
16a Pull rotor
16b Movable core
16c Brake drum
16d Coil spring
17 End cover
18 Bearing
19 Fan
20 Fan cover
20a Ventilation hole
20b Opening
20c Exhaust hole
21a, 21b Bearing
22 Spring member
23a, 23b Bearing
25 Load gear
30 Fan
f Fin

What is claimed is:
1. A hoist comprising:
a motor for lifting and lowering a load, the motor being driven by an inverter controller and including a first forced cooling unit;
a mechanism unit including a reduction gear mechanism and a load sheave for winching up and down a chain with power from the reduction gear mechanism;
a casing for accommodating the motor and the mechanism unit; and a regenerative resistance unit to which regenerative electric power generated in the motor is supplied, wherein the motor, the mechanism unit, the inverter controller and the regenerative resistance unit are arranged in the casing in a distributed manner so that weights thereof balance out one another in relation to a center of loading that acts on the hoist at the time of winching up and down, wherein the inverter controller and the regenerative resistance unit are arranged so as to be separated from each other with the mechanism unit interposed therebetween, and wherein the regenerative resistance unit is fixed to the casing to be in contact with the casing.

2. The hoist according to claim 1, wherein the inverter controller is fixed to the casing so as to be in contact with the casing.

3. The hoist according to claim 1, wherein the motor, the inverter controller and the regenerative resistance unit are arranged in relation to one another and based on a distance from the center of the load to a center of the motor in a longitudinal direction, on a distance from the center of the load to the inverter controller, on a distance from the center of the load to the regenerative resistance unit, on a distance from the center of the load to a central axis of the motor, on a distance from the central axis of the motor to a center of the inverter controller, and on a distance from the central axis of the motor to a center of the regenerative resistance unit.

4. The hoist according to claim 1, wherein the inverter controller is closely fixed to a part of the casing which partially surrounds the reduction gear mechanism filled with gear oil.

5. The hoist according to claim 1, wherein the regenerative resistance unit is closely fixed to a part of the casing close to the motor, and the first forced cooling unit of the motor is adapted to provide a forced cooling effect for the regenerative resistance unit.

6. The hoist according to claim 5, further comprising a fan cover covering the first forced cooling unit and the regenerative resistance unit, the fan cover including a ventilation hole at a position corresponding to the first forced cooling unit, an opening at a position corresponding to the regenerative resistance unit, and an exhaust hole.

7. The hoist according to claim 1, wherein a second forced cooling unit is provided at an end of a motor shaft of the motor close to the inverter controller, the second forced cooling unit being adapted to provide a forced cooling effect for the inverter controller.

8. The hoist according to claim 1, wherein the casing has a plate-shaped rib extending toward the mechanism unit from an opposite side of the side on which the regenerative resistance unit is attached.

9. The hoist according to claim 1, wherein the regenerative resistance unit is attached to a plate-shaped regenerative resistance unit attachment part of the casing on the side of the motor protruding in a direction perpendicular to a motor shaft of the motor.

* * * * *